United States Patent [19]

Isert

[11] Patent Number: 4,775,247
[45] Date of Patent: Oct. 4, 1988

[54] LINEAR MOTION GUIDE UNIT

[76] Inventor: Hugo Isert, Bahnhofstrasse 33, D-6419 Eiterfeld 1, Fed. Rep. of Germany

[21] Appl. No.: 41,300

[22] Filed: Apr. 22, 1987

[30] Foreign Application Priority Data

Apr. 29, 1986 [DE] Fed. Rep. of Germany ....... 8611710

[51] Int. Cl.$^4$ .............................................. F16G 29/06
[52] U.S. Cl. ........................................ 384/43; 384/45
[58] Field of Search ................ 384/43, 55, 44, 45, 384/49, 52, 57, 59

[56] References Cited

U.S. PATENT DOCUMENTS 2,918,333 12/1959 Friedman ............................ 384/55
4,572,590 2/1986 Teramachi ........................... 384/45

FOREIGN PATENT DOCUMENTS 0080515 11/1981 European Pat. Off. .
1124901 10/1956 France .
3040711 10/1980 Fed. Rep. of Germany .
1081669 8/1967 United Kingdom .

Primary Examiner—Lenard A. Footland
Attorney, Agent, or Firm—Fred Philpitt

[57] ABSTRACT

The invention relates to a guide unit (10) for effecting linear motion. It includes a rail body (12) having longitudinal recesses (20) in which shafts (22) are held so as to protrude with their outside (24). The top face (18) of the rail body comprises edges by way of upper ribs (26) which may be elastic or adjustable in opposition to rigid lower ribs (28). Along the center of the rail body (12), there are evenly spaced hollows (32) into which fitting pieces (30) are squeezed. For improved force-fit, the top (18) of the rail body (12) may have a longitudinal slot (52) with bores; if cylindrical rollers ar pressed thereinto, the upper ribs (26) bend down to firmly and uniformly grip the shafts (22). These may be positively engaged by linear ball bearings (42) of a carriage (40) slideably mounted to the guide unit (10).

20 Claims, 2 Drawing Sheets

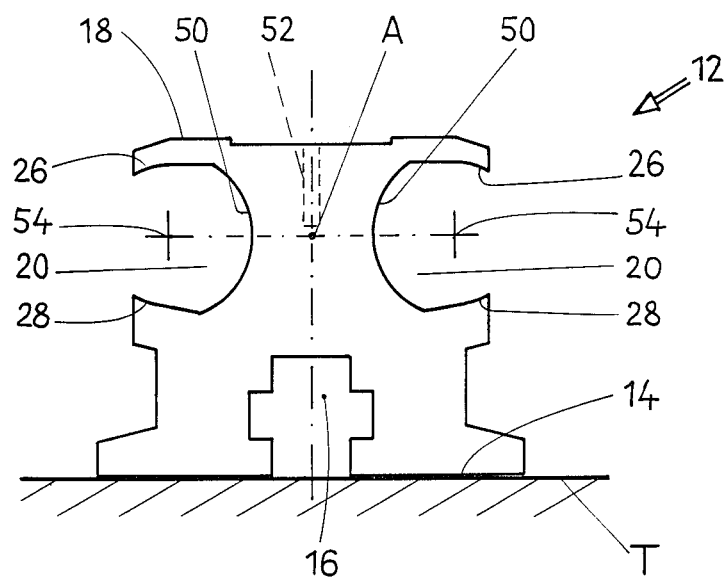
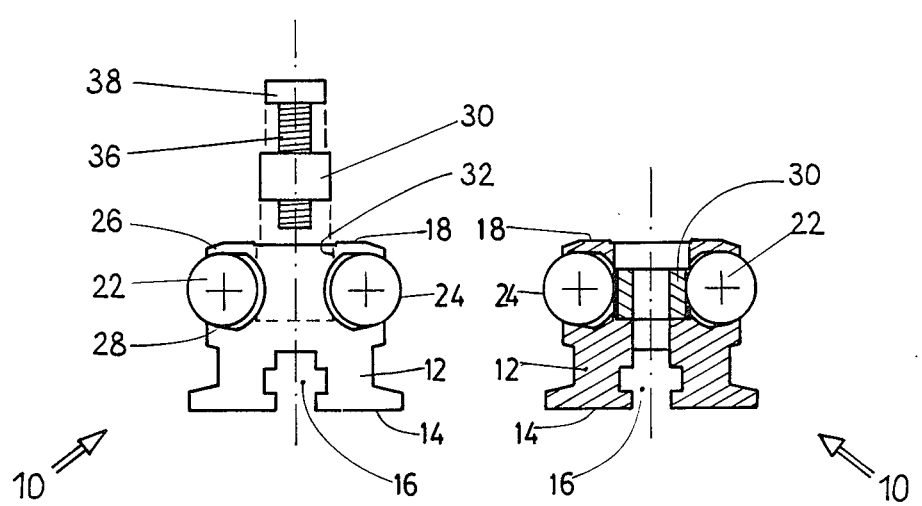

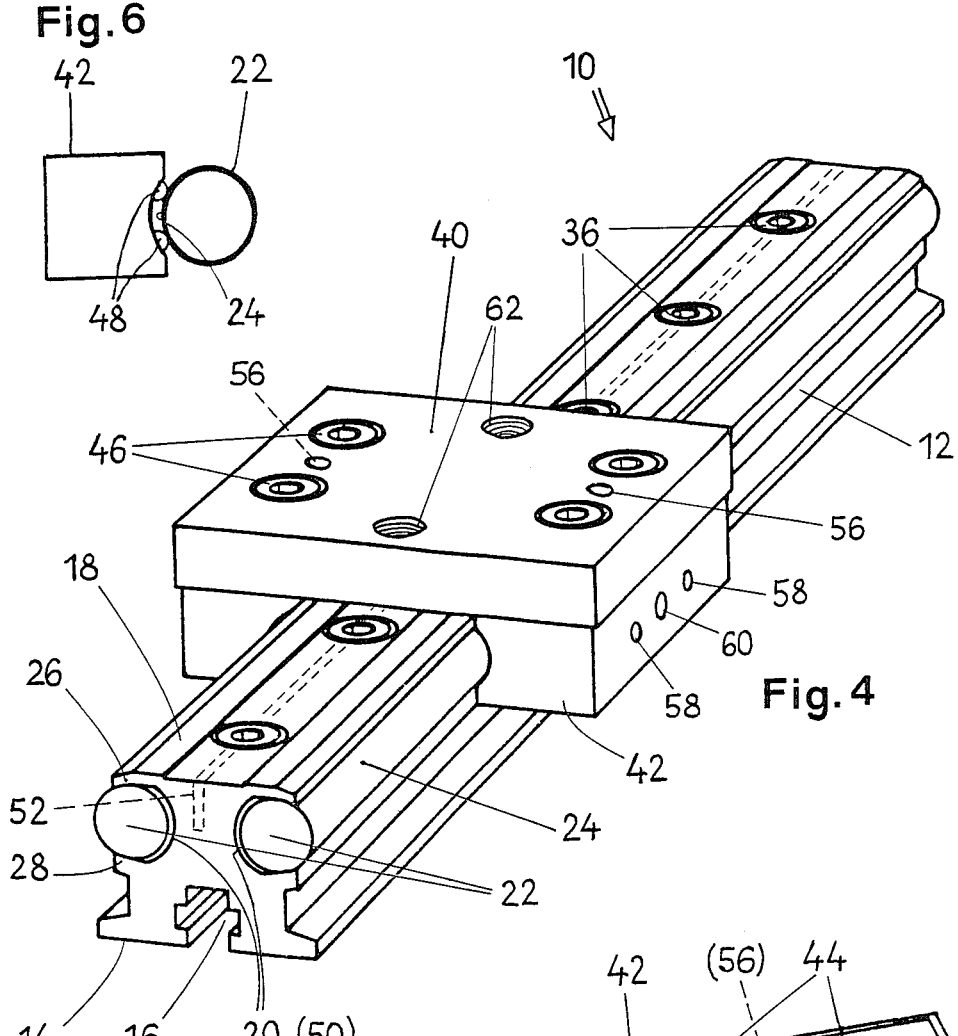
Fig. 6
Fig. 4
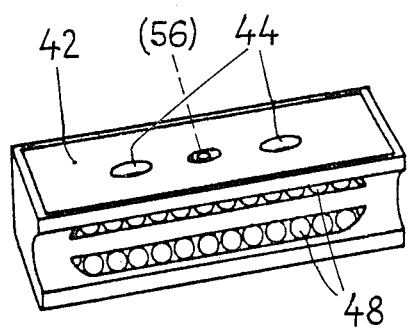
Fig. 5

LINEAR MOTION GUIDE UNIT

The invention relates to a guide unit for effecting linear motion.

BACKGROUND OF THE INVENTION

Guide means permitting an exact motion of translation are required for variegated applications, in particular in the precision mechanics and electronic industries. For this purpose, there has been proposed in FR-PS No. 1 124 901 a rail whose head supports pairs of shafts on either side which are opposed by like pairs of shafts of a top carriage that is freely shiftable due to a plurality of balls between the neighboring pairs of shafts. However, considerable design effort is necessary to hold continuous series of balls tied along the entire rail. Relief came when the device according to GB-PS No. 1 081 669 was developed wherein a carriage is provided with linear ball bearings that run on shafts on either side of a rail body, riding on half the shaft periphery and pressing the respective shaft onto a side groove in the rail body. Such arrangement, though, necessitates large tolerances; smooth running can easily be disturbed by maladjustment.

The guide system disclosed in DE-OS No. 30 40 711 employs two shafts supported on either side of a series of pillow blocks or pads. A carriage comprises pairs of rollers that run on the shafts at an obtuse angle to each other. The accuracy of the motion is determined by the exactitude with which the rollers are mounted in the carriage. Since the pillow blocks have to be introduced one by one in order to secure them on a support at given distances, the attachment of the rails is rather costly. Much the same holds for the use of clamping profiles that support the shaft along its length, exact fitting being of extreme importance. Another design as specified in EP-A No. 1-0 080 515 includes a rail support with a backing plate engaging the outer top of the shafts for pressing them towards the interior. Here it is, however, critical to fasten the bolts which pass through the individual pillow blocks, as the shafts may be slightly deformed.

OBJECTS OF THE INVENTION

It is a general object of the invention to create a simplified and improved guide unit.

More particularly, the invention aims at obtaining a linear motion guide unit which can be easily produced and be reliably mounted within little time, without loss of accuracy.

Another object of the invention is the creation of a simple structure for linear motion guide means, permitting fast attachment and easy use.

SUMMARY OF THE INVENTION

In a guide unit for effecting linear motion, including a rail body supporting at either side of its longitudinal axis one shaft each, at the outside of which at least one body to be guided (such as a carriage) is adapted to be slideable by way of linear ball bearings, the invention provides the rail body to be an integral clamping profile that includes hollows for receiving fitting pieces by which the shafts are fixed.

The use of such fitting pieces is very advantageous in that the securing means for the rail body do not any more influence the clamping force which holds the shafts in their positions. This contributes greatly to the precision of the guide unit which can be made to small overall dimensions. The fitting pieces also permit a substantial reduction of manufacturing cost; in addition, mounting is much facilitated and accelerated.

SPECIALIZATIONS OF THE INVENTION

The rail body may be provided, on either side, with longitudinal recesses defined by upper and lower ribs each which hold the shafts. It is most important that these longitudinal recesses need not have any exact fit for receiving the shafts, as these are fixed by means of the fitting pieces. Therefore, the components are quickly assembled, especially by clamping the ribs onto the shafts as the fitting pieces are wedged into the rail body interior.

Further, the upper ribs may be elastic or adjustable so as to linearly tie the shafts from above.

Both manufacture and mounting are sped up through the use of fitting pieces of uniform shape that can be easily pressed into hollows arranged along the longitudinal center of the rail body top. The transverse clamping force component will be uniform by dimensioning the size and the spacing of the hollows attuned to the shaft diameter so that the guide unit will warrant linear motion to an extent of precision hitherto unknown. Very simple is the design whereby merely cylindrical rollers have to be fitted into bores in the rail body with the top face of which the heads of fixing bolts may be flush, unless they are countersunk. Thus from the outside, only a smooth surface free of protections will be apparent.

No further adjustment, or means therefor, will be required if the maximum width or the maximum diameter of the fitting pieces is taken to automatically determine the minimum spacing of the shafts. Consequently, the unit can be dismantled and remounted at any time without any worry as to the precision of the assembly.

Particular stability is achieved where the ribs provide three-line engagement to the shafts and at least three-point engagement by the fitting pieces, preferably at angles of about 120 degrees each.

The top of the rail body may have a longitudinal slot permitting insertion of the fitting pieces such that the upper ribs will bend down to grip the shafts and also to positively engage bushing-type grooves inside the longitudinal recesses. This contributes to the ready mounting and to the sturdiness of the guide unit.

Further features, particulars and advantages of the invention will be apparent from the wording of the claims and from the following description of preferred embodiments shown in the annexed drawings wherein:

FIG. 1 is a front view of a linear motion rail body,

FIG. 2 is a front view of a guide unit prior to assembly,

FIG. 3 is a transverse sectional view of the guide unit of FIG. 2 after assembly, fixing screws being omitted, FIG. 4 is a perspective view of a guide unit including a carriage, FIG. 5 is a perspective view of a linear ball bearing and FIG. 6 is a schematic side elevation of the linear ball bearing of FIG. 5 engaging a shaft.

DESCRIPTION

The basic design of a linear motion guide unit generally designated by 10 will be evident from FIGS. 1 to 4. It includes a rail body 12 (FIG. 1) which may be made of a drawn aluminium profile. The plane bottom face 14 of rail body 12 is intended for attachment to a support T (merely indicated) that may consist of a plate. Fixing may be effected by means of bolts 36 (FIG. 2) and of nuts (not shown), in particular by nuts sliding in a flute 16 at the underside of rail body 12 the upper side of which is an essentially plane top face 18 whose middle may be slightly recessed.

Rail body 12 has, on either side, recesses 20 for receiving shafts 22 the outside 24 of which laterally projects from the rail body 12 but which are gripped therein by upper ribs 26 and lower ribs 28, respectively. The clearance between the ribs 26, 28 by which the recesses 20 are defined is smaller than the diameter of the shafts 22 which at first may have some bearing play within the recesses 20. The upper ribs 26 may be elastic or adjustable in a direction transverse to the shafts 22; by contrast, the lower ribs 28 are rigid.

Transverse to a longitudinal axis A of rail body 12 and preferably perpendicular to its top face 18, there are evenly spaced bores 32 in the rail body. Where shafts 22 of, say, 12 mm diameter are employed, distances of 50 mm each may be expedient. Fitting pieces 20, especially hardened and ground cylindrical rollers, are provided for force-fit in the bores 32. The diameter of the fitting pieces 30 will govern the spacing of the shafts 22 from one another, as the shafts 22 are pressed onto the holding ribs 26, 28 from the interior of rail body 12 by the fitting pieces 30 wedged in. Thus the shafts 22 are precisely fixed in their positions. As seen in a sectional view, there is a three-point or three-line clamping of the shafts 22, preferably at angles of about 120 degrees each.

It will be noted that the fitting pieces 30 must not necessarily be cylindrical. Rather, they may have other shapes as well, such as that of slightly tapered pads. They are secured by means of fixing bolts 22 (FIG. 2) extending through the fitting pieces 30 and screwing with nuts, in particular with sliding nuts situated in a T-shaped groove 16 at the underside of rail body 12. Alternatively, the bolts 36 may directly be screwed into the support T. The heads 38 of the fixing bolts 36 may be flush with the top face 18 of rail body 12 or may be countersunk therein. FIG. 4 shows an example of an application. The guide unit 10 bears a carriage 40 the underside of which is provided with linear ball bearings 42 on either side, attached to the carriage 40 by hold-down screws 46 passing through transverse bores 44. Each ball bearing 42 includes a double track or double linear string 48 of balls (FIG. 5). On top of carriage 40, there are threaded holes 62 for attaching any devices (not shown) to be moved along with the carriage 40. Once the latter has been fitted onto the guide unit 10, the double track 48 of each linear ball bearing 42 will positively and slideably engage the outside 24 of the respective shaft 22 (FIG. 6).

For exact fit of the centers of the linear ball bearings 42, the carriage 40 includes dowel pins 56 parallel to the transverse bores 44 and to the hold-down screws 46. At their outside, the linear ball bearings 42 comprise two gauge bores 58 for precise measuring by means of tracing pins and tools (not shown) and further comprise an adjustment and lubricating bore 60. Owing to the exact parallelity of the two tracks or strings 48 of balls and to the possibility of adjusting the linear ball bearings 42, an extremely smooth run of the carriage 40 along the shafts 22 is obtained. Since the guide unit 10 is distinguished by a degree of precision hitherto unknown, the carriage 40 can move to and fro most accurately, with friction being reduced to an absolute minimum.

A development of the invention is schematically shown in FIGS. 1 and 4. The top face 18 of rail body 12 may comprise a longitudinal slot 52 whose depth extends to about the plane of the shaft axes 54. The fitting pieces 30 are shaped so as to force apart the two interconnected halves of rail body 12 whereby the upper ribs 26 bend down onto the shafts 22 so that these are pressed downwards and also inwards. By suitably dimensioning the longitudinal slot 52 as well as the fitting pieces 30, optimum fixation of the shafts 22 in the rail body 12 can be achieved easily and accurately.

It will be evident that the linear motion guide unit 10 according to the invention secures the precise positioning of the shafts 22 in the rail body 12 through the use of fitting pieces 30 in a very simple and positive way. Modifications of the invention include oblong fitting pieces 30 or longitudinal connections of the fitting pieces, up to integral bracings or rods of proper shape for the force-fit described, so that continuous engagement of shafts 22 to the holding ribs 26, 28 will be even improved.

While preferred embodiments have been illustrated and explained hereinabove, it should be understood that numerous variations and modifications will be apparent to one skilled in the art without departing from the principles of the invention which, therefore, is not to be construed as being limited to the specific forms described.

I claim:

1. Guide unit for effecting linear motion, including a rail body supporting at either side of its longitudinal axis one shaft each, at the outside of which at least one body to be guided is adapted to be slidable by way of linear ball bearings, or rollers, wherein the rail body is an integral clamping profile that includes hollows for receiving fitting pieces by which the shafts are fixed.

2. Guide unit according to claim 1, wherein for receiving the shafts, the rail body is provided on either side with one longitudinal recess each defined by upper and lower ribs whose clearance is smaller than the shaft diameter.

3. Guide unit according to claim 2, wherein by means of the fitting pieces, the shafts are adapted to be clamped from the inside onto the ribs.

4. Guide unit according to claim 3, wherein the lower ribs are rigid and wherein the upper ribs are either elastic or adjustable in a direction towards the adjacent shaft.

5. Guide unit according to claim 3, wherein as seen in a cross sectional view, the propping of the shafts by the ribs and by the fitting pieces forms a three-point or three-line bearing, preferably at angles of about 120 degrees each.

6. Guide unit according to claim 2, wherein the lower ribs are rigid and wherein the upper ribs are either elastic or adjustable in a direction towards the adjacent shaft.

7. Guide unit according claim 1, wherein the fitting pieces are of uniform shape and wherein the hollows are arranged along the longitudinal center of the top of the rail body.

8. Guide unit according to claim 7, wherein the size and the spacing of the hollows are tuned to the shaft diameter such that the shafts propped by the fitting pieces are of uniform linearity even on a micromechanical scale.

9. Guide unit according to claim 8, wherein the fitting pieces are cylindrical rollers and wherein the hollows are bores arranged transversely to the longitudinal axis of the rail body.

10. Guide unit according to claim 9, wherein as seen in a cross sectional view, the propping of the shafts by the ribs and by the fitting pieces forms a three-point or three-line bearing, preferably at angles of about 120 degrees each.

11. Guide unit at least according to claim 7, wherein the fitting pieces are cylindrical rollers and wherein the hollows are bores arranged transversely to the longitudinal axis of the rail body.

12. Guide unit according to claim 7, wherein as seen in a cross sectional view, the propping of the shafts by the ribs and by the fitting pieces forms a three-point or three-line bearing, preferably at angles of about 120 degrees each.

13. Guide unit according to claim 1, wherein through each fitting piece, at least one fixing bolt extends that includes a head which is either flush or countersunk relative to the top face of the rail body.

14. Guide unit according to claim 1, wherein with respect to the cross sectional area of the rail body, the minimum distance between the shafts is determined by either the maximum width or the maximum diameter of the fitting pieces.

15. Guide unit according to claim 1, wherein the rail body has at its top a longitudinal slot.

16. Guide unit according to claim 15, wherein the depth of the longitudinal slot substantially extends to the plane of the shaft axes.

17. Guide unit according to claim 16, wherein by forcing the fitting pieces into the hollows, the upper ribs are adapted to bend down such that the shafts are continuously engaged by the upper and lower ribs.

18. Guide unit according to claim 16, wherein by bending the upper ribs and/or by forcing the fitting pieces into the hollows, the shafts are adapted to be pressed for positively engaging bushing-type grooves of the longitudinal recesses.

19. Guide unit according to claim 15, wherein by forcing the fitting pieces into the hollows, the upper ribs are adapted to bend down such that the shafts are continuously engaged by the upper and lower ribs.

20. Guide unit according to 15, wherein by bending the upper ribs and/or by forcing the fitting pieces into the hollows, the shafts are adapted to be pressed for positively engaging bushing-type grooves of the longitudinal recesses.

* * * * *